Nov. 4, 1952 — H. A. KULJIAN — 2,616,155
APPARATUS FOR MANUFACTURE OF THREADS
Filed April 30, 1947 — 4 Sheets-Sheet 1

INVENTOR.
Harry A. Kuljian
BY Louis Necho
ATTORNEY

Nov. 4, 1952 H. A. KULJIAN 2,616,155
APPARATUS FOR MANUFACTURE OF THREADS
Filed April 30, 1947 4 Sheets-Sheet 2

INVENTOR.
Harry A. Kuljian
BY Louis Necho
ATTORNEY

Nov. 4, 1952          H. A. KULJIAN          2,616,155

APPARATUS FOR MANUFACTURE OF THREADS

Filed April 30, 1947          4 Sheets-Sheet 3

INVENTOR.
Harry A. Kuljian
BY Louis Necho.
ATTORNEY

Nov. 4, 1952     H. A. KULJIAN     2,616,155
APPARATUS FOR MANUFACTURE OF THREADS

Filed April 30, 1947     4 Sheets-Sheet 4

INVENTOR.
Harry A. Kuljian
BY Louis Necho
ATTORNEY

Patented Nov. 4, 1952

2,616,155

UNITED STATES PATENT OFFICE 2,616,155

APPARATUS FOR MANUFACTURE OF THREADS

Harry Asdour Kuljian, Merion, Pa.

Application April 30, 1947, Serial No. 744,885

3 Claims. (Cl. 28—71.7)

This invention relates to the art of manufacturing synthetic threads of the type which are produced by extruding an appropriate preparation into an appropriate coagulating medium and by subsequently treating said filament, this application being a continuation, in part, of my copending application Ser. No. 666,007 filed April 30, 1946, now Patent No. 2,543,031, issued February 27, 1951, entitled Thread Advancing Reel.

The main object of the invention is to produce improvements in the manufacture of such threads.

In the manufacture of threads of the type set forth, it has heretofore been proposed to collect a freshly coagulated filament in the form of a skein, cake, or other package, and then to process such threads by subjecting the cake or other package, as a whole, to various chemical and washing treatments. This practice is exemplified by Patent No. 2,200,197, issued to Allen et al. on May 7, 1940. A thread thus produced was not always uniform in quality and, because it was produced by the batch, as distinguished from continuous operation method, the cost of such thread was relatively high.

To overcome this difficulty, it was proposed to cause a freshly coagulated filament to move over a number of spaced, thread-storing and thread-advancing devices, and the filaments were subjected to the various treatments while they moved axially of the various thread-advancing devices. Due to the number of different treatments required, and in order to make mass production possible, a machine built as suggested was necessarily relatively high, and, therefore, the higher portions of the machine were inaccessible to an operator occupying a position near the lower portion of the machine, and vice versa. Patent No. 2,346,696, issued to Moritz et al. on April 18, 1944, and Patent No. 2,246,735, issued Kline et al. on June 24, 1941, are representative of this practice.

To overcome this difficulty, it was further proposed to subject a freshly coagulated filament to all of the necessary treatments, while such filament moved axially of a single, elongated thread-storing and thread-advancing device, as shown by Patent No. 1,983,221, issued to Furness on December 4, 1934. However, the structure and method of operation disclosed in this patent are disadvantageous in that the thread-advancing device is of the sliding-bar cage type which has a tendency to break the filament; in that the thread-advancing device is relatively long so as to afford enough room and enough time for the various treatments; and in that the thread-advancing device disclosed presents difficulty in the threading of the filament and in the general servicing of the apparatus while in use.

It is, therefore, a further object of the invention to produce an improved thread-advancing device which will overcome all of the above and other disadvantages, and which will make the manufacture of synthetic threads by means of continuous operation, and on a mass production basis, commercially practical.

A still further object is to produce an improved thread-advancing device which includes three or more relatively short, cantilever-mounted rolls arranged in the form of a circle having a relatively large diameter so as to afford sufficient time for the completion of each of the necessary treatments while any given point on the filament is moving over a relatively short distance axially of the roll assembly.

A still further object is to produce an improved thread-advancing device in which the number, arrangement and adjustability of the axes of the rolls are such that the progress of the filament axially of the rolls may be accurately regulated.

A still further object is to produce an improved construction whereby the various chemical treatments and washings to which the filament is subjected as it moves axially of the thread-advancing device are more effectively carried out.

A still further object is to produce improved means for minimizing the intermingling of the various liquids used in the various treatments to which the filament is subjected in different zones along the thread-advancing device.

These and other objects are attained by my invention as set forth in the accompanying drawings in which.

Figures 1, 2:
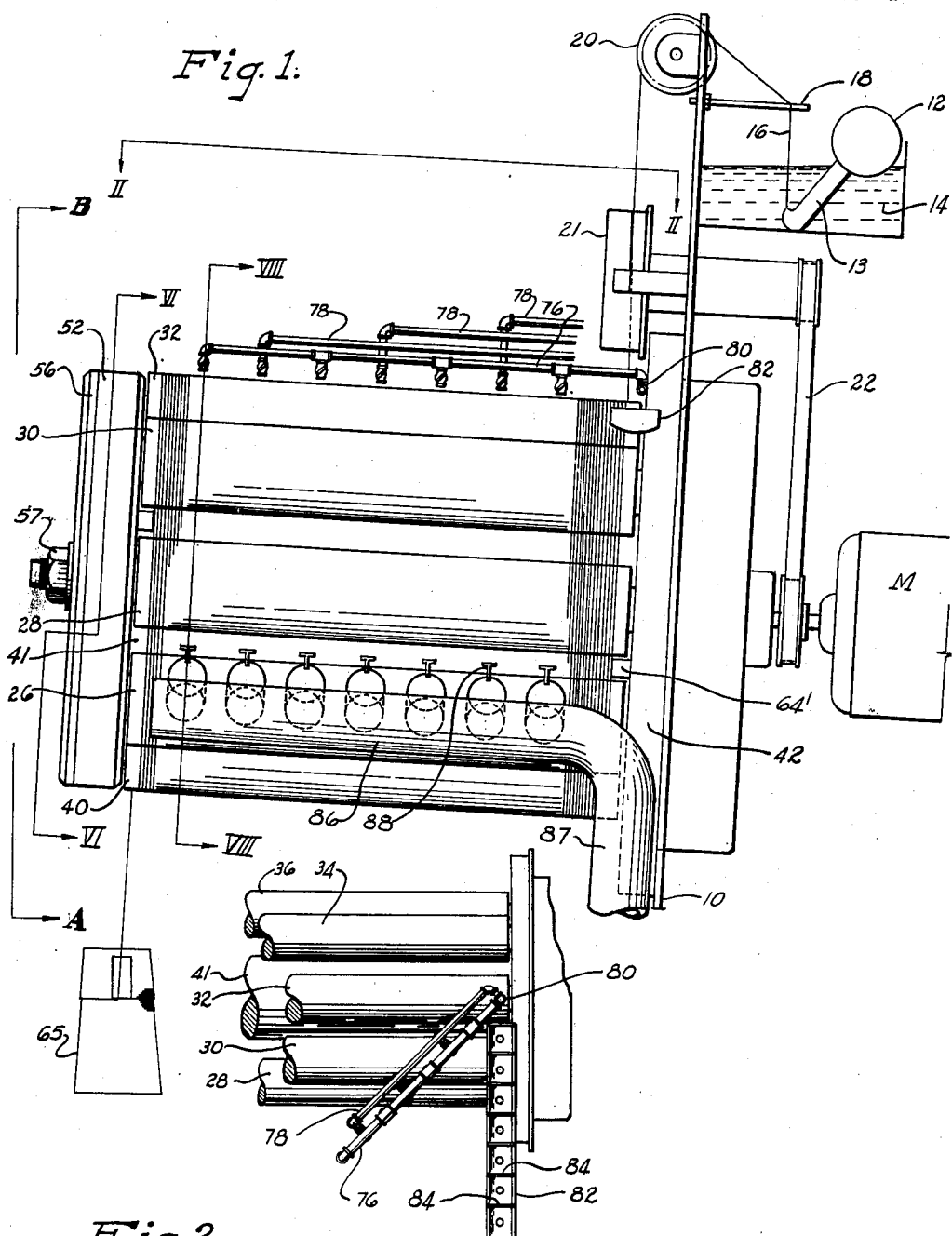
Fig. 1 is a fragmentary and diagrammatic side elevational view of a continuous-process synthetic thread manufacturing apparatus embodying the invention.
Fig. 2 is a fragmentary horizontal sectional view looking in the direction of line II—II on Fig. 1.

In the drawings there is illustrated an apparatus for continuously manufacturing synthetic yarn according to my invention. This apparatus includes a frame 10 for supporting the apparatus, and a motor M for supplying motive power, said frame and said motor being only partly shown.

The apparatus further includes a reservoir 12 containing an appropriate preparation and a spinnerette 13 through which an appropriate preparation is forced, under pressure, into a coagulating bath 14 to produce a filament 16. The filament thus produced must be subjected to various chemical and washing processes before it is ready for certain uses. To this end, the filament is passed over a guide 18, over a freely-rotating godet wheel 20 and over a godet 21 which is driven by means of a belt 22 which derives its power from the motor M.

In order to process the filament according to my invention, I cause the filament to move, in a helical path axially of the improved thread-storing and thread-advancing device which is illustrated in the drawings.

Figure 3:
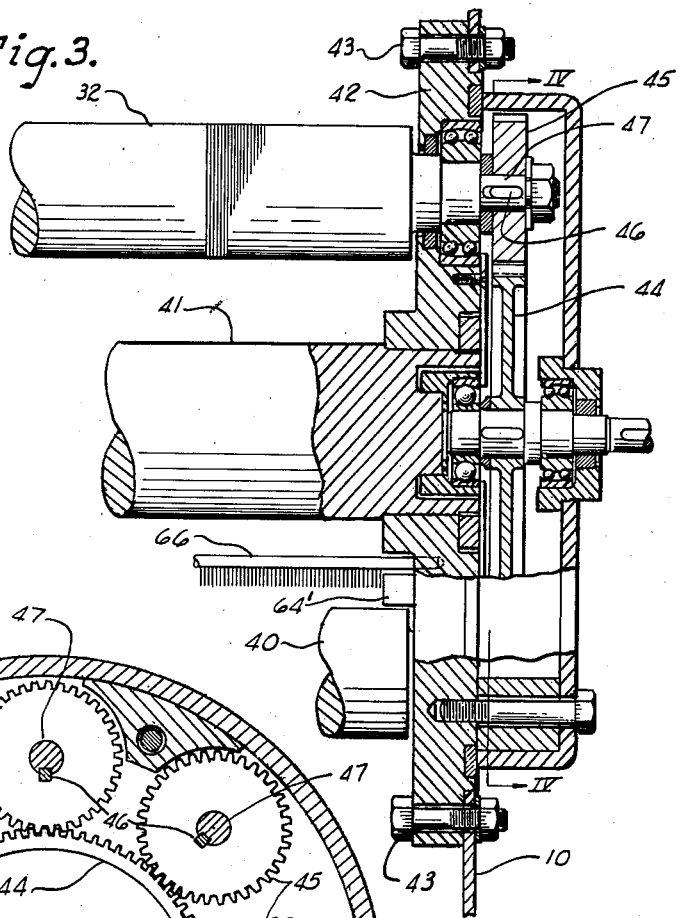
Fig. 3 is a fragmentary, vertical sectional view of the right-hand portion of Fig. 1, showing the manner in which the thread-advancing device forming part of the apparatus is mounted and driven.
Figure 4:
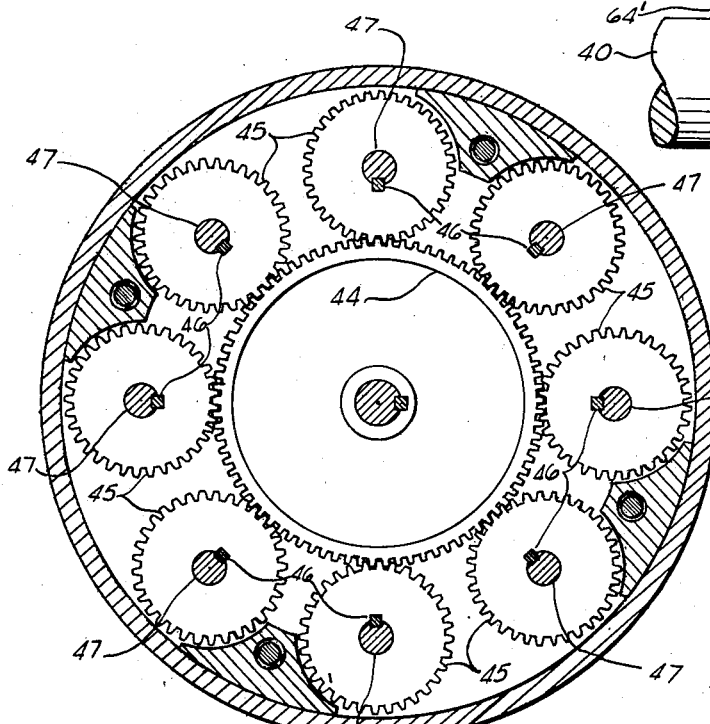
Fig. 4 is a sectional view looking in the direction of line IV—IV on Fig. 3.

The thread-advancing device referred to is formed of a plurality of rotatable rolls 26, 28, 30, 32, 34, 36, 38 and 40, which are disposed in the form of a circle about a fixed central post 41 and form a cantilever supported thread-storing and advancing device. The inner ends of the rolls are mounted in self-aligning anti-friction bearings carried by an end plate 42 which is secured at 43 to the frame 10. The rolls are individually rotated by means of a central gear 44 which is driven by the motor M and which meshes with eight gears 45, keyed at 46 to the reduced ends 47, of the rolls as shown in Figs. 3 and 4. By this means, all of the rolls are driven synchronously so as to cause said rolls to rotate about their respective horizontal axes.

The outer ends of the rolls are likewise journaled in anti-friction bearings 50 which are provided in an end plate 52. The plate 52 is rotatable about the adjacent end 53 of the central post 41, the other end of which is carried by the inner fixed end plate 42, as shown in Fig. 3. The plate 52 abuts against a fixed outer end plate 56 which is secured to the end of the post 41 by any suitable means 57.

Figure 6:
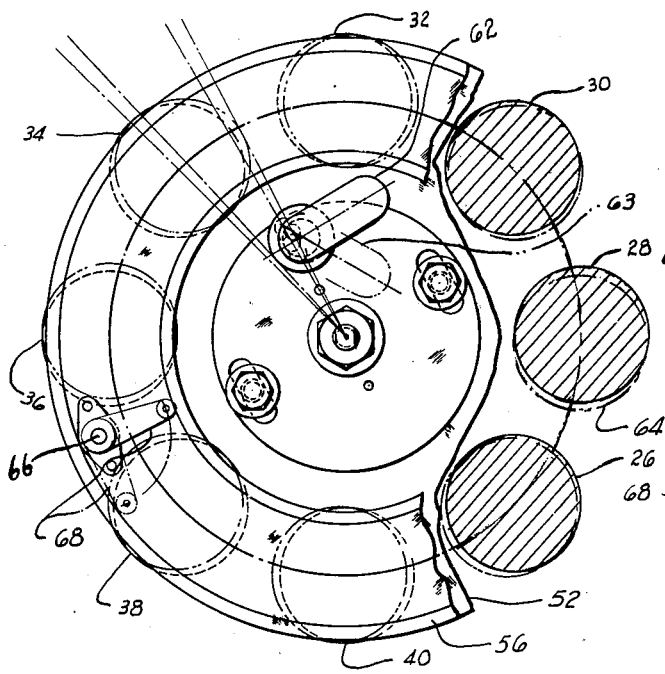
Fig. 6 is a sectional view looking in the direction of line VI—VI on Fig. 1.

In order to provide for automatically advancing the filament when the end thereof is wound upon the thread-advancing device so as to include or circumscribe all of the rolls, I provide for skewing the axes of the rolls and, while it is possible to cause the thread to advance by skewing one or two of the rolls, I prefer to skew the axes of all of the rolls equally and simultaneously. To this end, I provide an eccentric 60 which extends through an aperture in the outer end plate 56 and engages a slot in the rotatable plate 52. The eccentric is operated by means of a handle 62 and the structure is such that, when this handle is in the solid line position of Fig. 6, all of the rolls will be parallel to each other and to the axis of the fixed roll 41. When the handle 62 is moved toward the dot-and-dash line position, as indicated at 63, the axes of the rolls will be skewed as indicated at 64 in Fig. 6, to cause a filament wound about the thread advancing device to move, when the rolls are rotated, axially of, and in a helical path about the thread advancing device. As illustrated, the movement of the filament is from right to left, or from the inner toward the outer end of the thread advancing device as viewed in the drawings. The amount of skewing necessary to cause the filament to move in the manner set forth is extremely small and the displacement of the axes of the rolls at their outer ends is, in practice, about one sixteenth of an inch, more or less. Due to the length of the rolls, this displacement is much smaller at the inner ends of the axes of the rolls and the average tolerances to which a machine of this type is built are enough to permit such displacement. In other words the self aligning bearings and the gears are so constructed and arranged that a very small play does not interfere with their proper operation.

Because the rolls are skewed by merely rotating the outer end plate 52 so as to displace their axes at their outer ends which are not in mesh with the driving gears, the rolls can be skewed to the desired extent even when the driving gears are in motion.

In order to prevent the filament from entering between the inner end plate 42 and the adjacent ends of the rolls, I provide the stops (64 prime) 64' or their equivalent.

The device thus far described constitutes a complete apparatus and operates as follows: The handle 62 is moved in clockwise direction from the position shown in Fig. 6 before or after the rolls are set in motion, so as to skew the axes of the rolls. The operator then takes the end of the filament and, while standing in front of the machine, i. e., facing in the direction of the line A—B, in Fig. 1, the operator winds the end of the filament a few times, about the inner end of the thread-advancing device.

In a short time, the end of the continuously forming or feeding filament will have formed a band or bundle at a point near the inner ends of the rolls. Due to the skewing and rotation of the rolls at this bundle will move, from its point of incidence near the inner end of the rolls, toward the outer end of the rolls where the bundle is cut and removed. The filament trailing the bundle will thus be laced about the thread advancing device and will continue to move, in a spiral path, which encompasses all of the rolls, axially of the rolls. From the outer end of the thread advancing device, the filament is taken up on a bobbin, cone, twister or the like 65.

The thread-advancing device of my invention thus facilitates threading or lacing of the filament onto the device at the beginning of the manufacturing or processing operation, and facilitates and improves the manufacture and processing of synthetic or other threads.

For example, when the Furness type of device is used, the operator must lace the filament around the supported end of the cage, and this, due to the length of the cage and intervening mechanisms, is difficult. When my device, which is relatively short, is used, the operator can readily reach the far, or supported, end of the thread-advancing device. Furthermore, different filaments or different portions of the same filament may require different rates of movement and, with the cage-type thread-advancing device, it is impossible to change the rate of advance of the filament while the filament is in motion, as can be easily done with my construction. The same is true of the skewed roll type of advancing devices shown in Moritz and in Kline, except that the latter structures also possess a further disadvantage in that, to initiate the manufacturing or the processing operation, the filament must be wound around each of a large number of widely scattered rolls or pairs of rolls. In my structure, complete manufacturing or processing of synthetic or non-synthetic threads is carried out on a single, compact and readily accessible thread-advancing device.

Other things being equal, the rate of movement of the filament axially of the thread-advancing device is a function of the pitch of the helix formed by the filament about said device, and this, in turn, is a function of the skew angle of the roll or rolls forming the device. In the interests of efficiency, it is desirable to speed the movement of the filament axially of the roll or rolls circumscribed thereby and if, for the moment, the time required for treatment of the filament while it progresses over the thread-advancing device be ignored, it follows that a relatively large skew angle, with a correspondingly rapid rate of movement of the filament, would be highly desirable.

This is not feasible in structures where the filament is passed over two rolls, the axis of one of which is skewed because, if the skew angle is increased to increase the speed of movement of the filament, the pitch of the helix formed by the filament is also increased. This increases the tension on the filament and increases the tendency of the individual convolutions to slip back because the entire amount of axial advance of each convolution must take place while the filament moves over a relatively short U-shaped path between the two spaced rolls. By my invention, which provides a relatively large number of rolls forming a circle of large diameter, the amount of axial advance per revolution is distributed over a relatively long portion of the filament and over a relatively large circular path. In other words, if a given point on the filament is to advance at the rate of ½ inch per revolution around the thread-advancing device, this advance will be divided by the number of rolls and will, in the present instance, represent 1/16 of an inch per roll, whereas, in a structure in which the advancing device is formed of two rolls, the advance will be ¼ of an inch on each roll.

Figure 5:
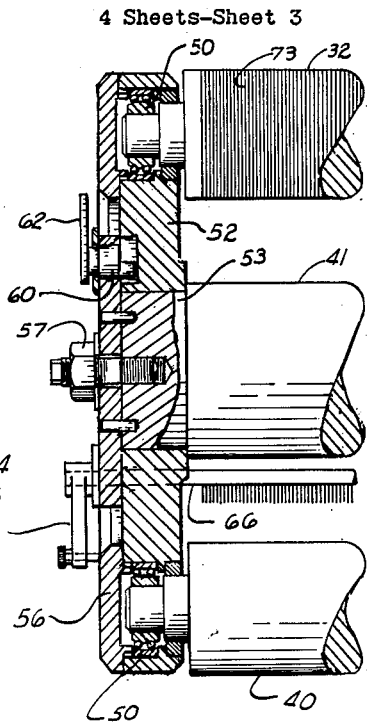
Fig. 5 is a view, similar to Fig. 3, showing details of construction of the left-hand end of the apparatus.
Figure 7:
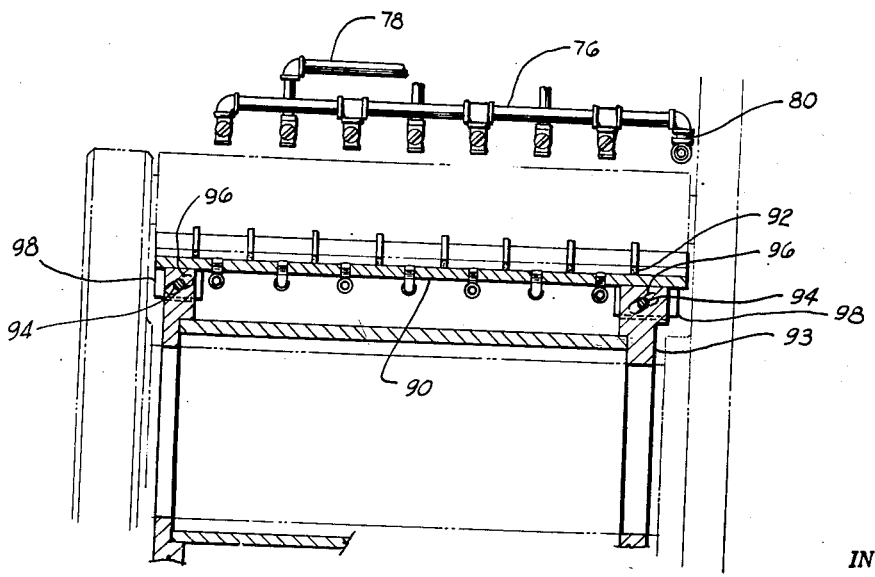
Fig. 7 is a diagrammatic and fragmentary view, showing the manner in which treating liquids are applied to and drained from the thread being processed.
Figure 8:
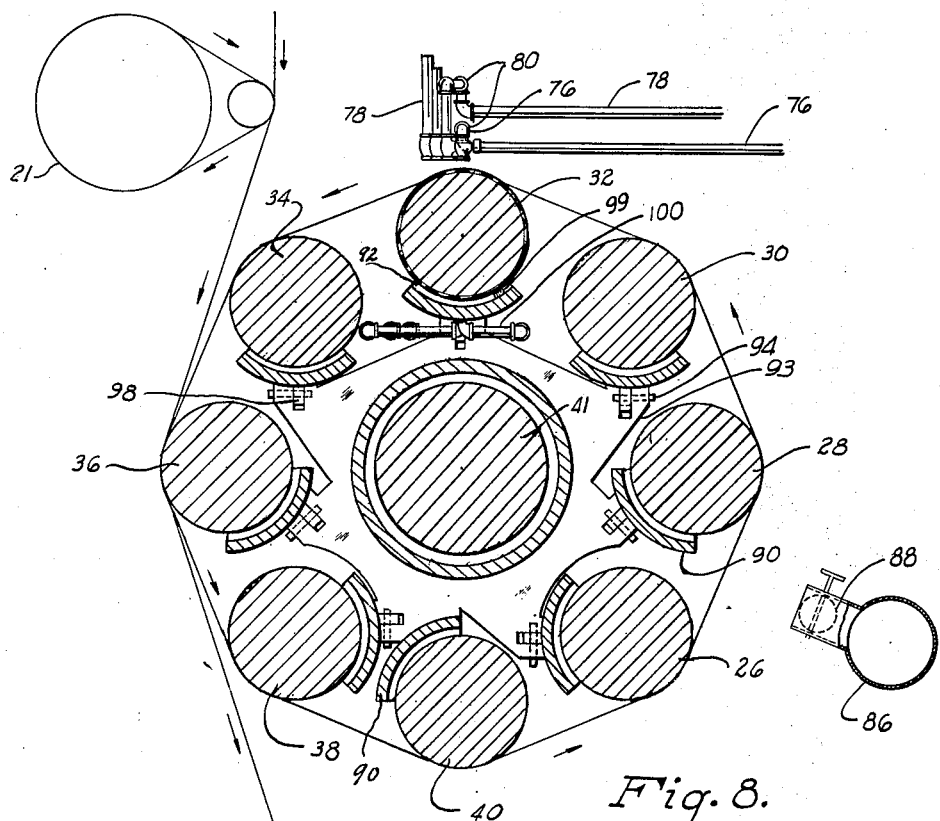
Fig. 8 is a diagrammatic and fragmentary view, partly in section and partly in elevation, looking in the direction of line VIII—VIII on Fig. 1.
Figure 9:
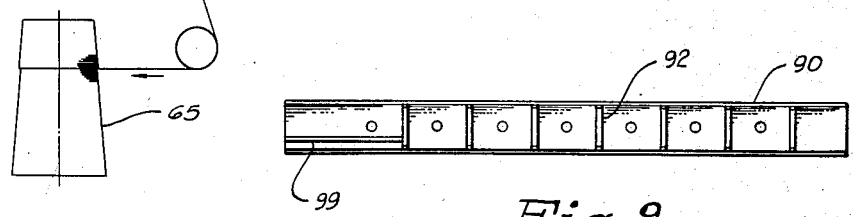
Fig. 9 is a top plan view, showing details of construction of the treating liquid segregating and draining device which is shown beneath the topmost roll of Fig. 8.

If it is desired, a spacing element may be used in conjunction with the thread-advancing device in order to maintain the spacing of the convolutions initially formed by the filament on the thread-advancing device. The spacing element referred to may take the form of a comb 66 which is positioned adjacent to one of the rollers, and is preferably movable to a position in which it does, and into a position in which it does not, engage the portions of the convolutions between adjacent rolls. As shown, the ends of the comb are journaled in the opposite end plates or other suitable fixed points and, at one end, it is provided with a handle 68 by means of which the comb can be rotated about its horizontal axis. Thus, and as shown in Figs. 3 and 5, the teeth, or effective edge of the comb, hang downwardly and are entirely out of contact with the filament. If, however, the handle 68 is moved from the solid to the dotted line position in Fig. 6, the comb will be rotated through an angle of ninety degrees and the teeth of the comb will project between the convolutions which circumscribe the rolls.

In actual use, after the filament has formed a helix axially of the thread-advancing device, the comb is rotated to cause its teeth to enter between the convolutions. The presence of the teeth of the comb between the convolutions serves to prevent slipping or back sliding of any of the helices and thus insures more uniform operation. While it is possible that there will be one convolution, or one thread, between each two teeth of the comb, it is possible that adjacent teeth of the comb may encompass more than one helix or thread.

Figure 10:
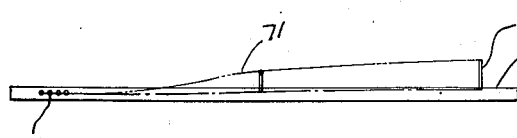
Fig. 10 is a top plan view of a second embodiment of a spacing device for spacing the helices formed on the thread storing and advancing device.
Figure 12:
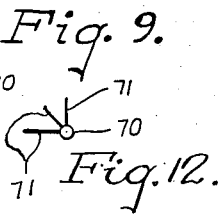
Fig. 12 is an end view of Fig. 10.
Figure 11:
Fig. 11 is a top plan view of a third embodiment of a spacing device.

The spacing element may take other forms. For example, it can be made in the form of a rod 70 having a spiral row of teeth 71 formed thereon, as shown in Fig. 10. The teeth 71 formed on the rod 70 can be made progressively longer from the outer toward the inner end thereof, so that, as the rod is rotated, the teeth on the inner portion of the rod will continue to engage the filament helices while the rod is being rotated far enough to cause the teeth near the outer end of the rod to engage the filament helices.

Except as pointed out, the spacing element 70 can be mounted and operated in the same manner as the comb 66.

The spacing element may also assume the form of a coil spring 72, one end of which may be secured to a point on the end plate 42 which corresponds to the point at which the inner end of the comb 66 is journaled. When it is desired to apply the spring, the operator takes the other end of the spring and stretches the spring until it forms a helix corresponding to the helix of the filament, moves the spring to a position in which the helices of the spring are interleaved with the convolutions of the filament, and anchors the free end of the spring to the front end plate 52 or to some other suitable fixed point. This form of spacing element has the advantage of being adjustable in that it has no fixedly spaced teeth but can be stretched to form a helix which will be complementary to the helix formed by the filament. If desired, one or more of the rolls may be provided with parallel, concentric grooves, as shown at 73 in Fig. 5.

When it is desired to subject the filament to various washings and chemical treatments, I provide a plurality of different pipes 76 having a series of controlled outlets for delivering water or other washing liquids to spaced zones along one or more of the rolls, as for example, along the roll 32, and other pipes, collectively referred to by the reference numeral 78, for delivering various liquids, such as bleaching, soaping, desulphurizing, or other reagents, to intermediate zones on the roll 32. The pipes 76 and 78 are preferably hinged, as at 80, so as to be disposed parallel to the rolls or parallel to the frame 10, to which latter position these pipes may be moved while threading the filament onto the thread-advancing device or when, for other reasons, it is desired to move these pipes to an out-of-the-way position. Since the quantity and the quality of the liquids are controlled, it is not desirable to have to shut these pipes when they are moved to their out-of-the-way position, so as to avoid having to reopen and reset the valves or other factors which condition the various fluids. I, therefore, provide an elongated trough 82 which is carried by the framework 10 and into which the pipes 76 and 78 empty when they are in their out-of-the-way position. Preferably, the trough 82 is compartmented by partitions 84 so that the liquids flowing from the various pipes may be segregated and returned to the respective sources of supply of said liquids.

Also, if desired, heat may be applied to various intermediate zones of the thread-advancing device so as to expedite or increase the effectiveness or efficiency of the chemical treatments and to the end zone of the device for the purpose of drying the filament.

For this purpose, I provide a manifold 86 which is supplied through a pipe 87 with a heated medium, such as hot air, the outlets of said manifold being provided with regulating means 88 for controlling the heat output through the various outlets according to the requirements of the various zones.

In order to prevent free intermingling of the various liquids which are supplied to various zones or portions of the filament, I provide each roll with an elongated dished member 90, which is provided with transverse partitions 92. The partitions 92 are made of felt or other material which will not snag or harm the filament, and are so spaced as to register with the junctions of adjacent zones. For example, one of the partitions 92 will contact the roll at the point where the bleaching treatment begins, and the next partition will contact the roll at the point at which the bleaching treatment ends so as to confine the bleaching liquids, as much as possible, to the zone of the filament which will be between the partitions referred to when the latter abut any of the rolls.

The elongated member can be mounted in any desired manner which will permit movement of the partitions 92 carried thereby, into or out of contact with the rotating rolls, without in any way interfering with the rolls or with their rotation. As shown, the members 90 are secured to a spider 93 by pins 94 engaging radially slanted slots 96 formed in end wings 98 carried by or formed on the spider. The spider is, in turn, mounted on the center fixed roll 41 and between the end plates 42 and 52. When it is desired to move the members 90 radially outwardly, so as to bring them into contact with or so as to adjust their pressure against the rolls, the members 90 are moved longitudinally of the spider 93 to cause the pins 94 to engage the radially outer portions of the slots 96. This causes the members 90 to move radially outwardly towards the rolls, and vice versa.

According to my invention, I also provide means for reducing the liquid content of the filament preparatory to the drying thereof. This is preferably accomplished by providing elongated wipers 99, which are carried by troughs 90, and which serve to scrape liquids from the inner surfaces of the corresponding end portions of the rolls. The removal of liquids from the surface of the rolls causes liquids to flow from the filament convolutions onto the roll. By this means some of the liquids which would otherwise be carried by the filament will be removed thus facilitating the drying of the filament.

In order to dispose of the liquid thus squeezed, one or more selected members 90 are provided with one or more apertures each, and a drain pipe or a plurality of drain pipes 100 are connected to said apertures to carry away the liquids squeezed from the various portions of the filament. Such liquids can be drained off in one common pipe and discarded as waste, or the liquids may be drained off in more or less uncontaminated manner, by a plurality of pipes, to be regenerated or reclaimed for re-use.

In the drawings I have shown a drain arrangement applied to only the uppermost roll, but it is clearly within the scope of my invention to apply this arrangement to any or to all of the other rolls.

The arrangement of a relatively large number of rolls in the form of a circle having a large diameter makes it possible to expedite the treatments of the filament; makes such treatments more effective; and makes it possible to carry out all of the treatments while the filament moves over a relatively short thread-advancing device.

For example, the relatively large diameter enables me to subject any given point on the filament to any desired treatment while such point travels a relatively short distance axially of the thread-advancing device. While this alone is a very useful expedient and greatly improves the operation, attention is also directed to the fact that the filament must travel over a relatively large number of rolls, and that the rolls are so arranged that helices formed by the filament are not tangent to the rolls but are bent and must ride over or hug a portion of the curved periphery of each of the rolls throughout their travel over the thread-advancing device. This plays an important part in expediting and making more effective each of the liquid treatments to which the filament is subjected, because every time a portion of the filament hugs a portion of a roll, the liquid content of this portion of the filament is squeezed out, more or less, and conversely, when said portion of the filament leaves a roll and is moving between two adjacent rolls, it tends to reabsorb the liquid draining downwardly from the rolls. This repeated squeezing and reabsorbing of the liquid effects a more efficient working of the liquid into the filament, and this expedites and improves the various treatments to which the filament is subjected. I, therefore, consider the arrangement of a relatively large number of rolls in such a fashion that the various portions of the filament are subjected to a squeezing action as they move over various portions of each of the rolls, as an important part of the invention.

It will thus be seen that, in addition to providing an improved thread-advancing device, I have also provided an improved manufacturing and/or processing machine whereby a freshly extruded filament or a previously manufactured thread, synthetic or otherwise, may be completely processed and made fit for use.

It will also be seen that my machine is compact, readily accessible and substantially automatic in its operation so that a great number of such machines may be attended to and kept in running order by a single operator and without the exercise of much skill and effort.

What is claimed is:

1. For use in connection with a filament processing apparatus of the type which includes a plurality of rolls arranged to cause a filament wound thereabout to move, when said rolls are rotated about their axes, axially of the rolls, in the form of a helix having spaced convolutions which circumscribe said rolls, an elongated member mounted for rotation about its own axis in a fixed position adjacent one of said rolls and having a plurality of spaced spirally arranged teeth, said member being rotatable about its axis to a first position in which said teeth protrude into the spaces between said convolutions to maintain the spacing between said convolutions and to a second position in which said teeth are withdrawn from the spaces between said convolutions.

2. The structure recited in claim 1 in which the length of said teeth increases progressively from one end of said elongated member to the other.

3. The structure recited in claim 2 in which said elongated member is moved to said first and second position by rotation about its own longitudinal axis whereby said teeth progressively engage said convolutions.

HARRY ASDOUR KULJIAN.

REFERENCES CITED

The following references are of record in the file of this patent:

UNITED STATES PATENTS

| Number | Name | Date |
|---|---|---|
| 343,801 | Entwistle | June 15, 1886 |
| 1,803,475 | Kampf | May 5, 1931 |
| 1,854,040 | Junkers | Apr. 12, 1932 |
| 1,920,224 | Weaver | Aug. 1, 1933 |
| 2,129,284 | Uytenbogaart | Sept. 6, 1938 |
| 2,132,753 | Nelson | Oct. 11, 1938 |
| 2,165,259 | Helm | July 11, 1939 |
| 2,210,913 | Knebusch | Aug. 13, 1940 |
| 2,254,251 | Uytenbogaart | Sept. 2, 1941 |
| 2,287,031 | Frohwein | June 23, 1942 |
| 2,302,508 | Sordelli | Nov. 17, 1942 |
| 2,317,747 | Ewing | Apr. 27, 1943 |
| 2,352,868 | Tarbox | July 4, 1944 |
| 2,416,535 | Naumann | Feb. 25, 1947 |
| 2,456,120 | Furness | Dec. 14, 1948 |